(12) United States Patent
Jeddeloh

(10) Patent No.: US 6,414,688 B1
(45) Date of Patent: *Jul. 2, 2002

(54) PROGRAMMABLE GRAPHICS MEMORY METHOD

(75) Inventor: Joseph M. Jeddeloh, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/239,633

(22) Filed: Jan. 29, 1999

(51) Int. Cl.$^7$ .................. G06F 12/02; G06F 15/167
(52) U.S. Cl. .................. 345/543; 345/542; 345/520
(58) Field of Search .................. 345/542–544, 345/556, 531, 501, 536, 520; 711/5, 170–173, 147, 153

(56) References Cited

U.S. PATENT DOCUMENTS

| | | | |
|---|---|---|---|
| 5,450,542 A | | 9/1995 | Lehman et al. .............. 345/542 |
| 5,659,715 A | * | 8/1997 | Wu et al. .................. 345/542 |
| 5,668,992 A | * | 9/1997 | Hammer et al. .............. 713/1 |
| 5,748,968 A | * | 5/1998 | Nally et al. .................. 345/542 |
| 5,895,481 A | * | 4/1999 | Yap .................. 711/5 |
| 6,104,417 A | * | 8/2000 | Nielsen .................. 345/542 |

FOREIGN PATENT DOCUMENTS

WO 9706523 * 2/1997 ............ G09G/1/16

* cited by examiner

Primary Examiner—Kee M. Tung
(74) Attorney, Agent, or Firm—Trop, Pruner & Hu, P.C.

(57) ABSTRACT

A method to programmably establish a plurality of graphic buffers in a computer system having a banked system memory architecture includes obtaining a first indication representing a performance characteristic of the computer system, obtaining a second indication representing a size of the system memory, selecting a plurality of graphic buffer configurations based on the first and second indications, and establishing one graphic buffer for each of the selected graphic buffer configurations in system memory, Where at least two of the plurality of graphic buffers are located in different banks of the system memory. In some implementations, the performance characteristic may indicate whether the computer system is designated to process and display two-dimensional graphics or three-dimensional graphics

20 Claims, 3 Drawing Sheets

PROGRAMMABLE GRAPHICS MEMORY METHOD

RELATED APPLICATIONS

This application is related to U.S. Ser. No. 09/240,514, filed on Jan. 29, 1999.

BACKGROUND

The invention relates generally to computer system memory architectures and, more particularly, to a programmable memory architecture that incorporates graphic buffer storage within system memory.

Referring to FIG. 1, conventional computer system 100 providing graphics capability may include central processing unit (CPU) 102, bridge circuit 104, and bridge circuit 106. Bridge circuit 104 provides host interface (HI) 108, system bus interface (SBI) 110, graphics port (GP) 112, and memory interface (MI) 114. Bridge circuit 106 couples system bus 116 to secondary bus 118.

Graphics controller (GK) 120 uses graphics memory (G-MEMORY) 122 to control the operation of graphics device 124. For example, graphics controller 120 may use graphics memory 122 to store data needed to render a three-dimensional (3D) image on graphics device 124. Graphics memory 122 is often dual port random access memory and is typically incorporated within, or as part of, graphics controller 120.

System memory (SYS-MEMORY) 126, in contrast to graphics memory 122, is typically standard dynamic random access memory (DRAM). System memory 126 may be used by CPU 102 during the execution of computer programs (user application programs and system software, for example).

In some computer systems, graphics port 112 and graphics controller 120 conform to the accelerated graphics port (AGP) specification. (See the "Accelerated Graphics Port Interface Specification," Revision 2.0, May 1998.) In such systems, graphics controller 120 may use a portion of system memory 126 (hereinafter, AGP memory) to store an image's texture information. For example, a fully compliant AGP controller may access system memory 126 directly to obtain an image's texture information.

Notwithstanding AGP memory, computer system 100 generally does not allow graphics controller 120 to use system memory 126. Nor does computer system 100 generally allow graphics memory 122 to be used for general system needs. Further, system 100 has a relatively high pin count because separate memories are used for system memory 126 and graphics memory 122. The high pin count, in turn, may make it more difficult to economically manufacture computer system 100. In addition, the use of separate graphics controller and memory controllers may also result in the duplication of bus interfaces, memory control and so forth. Thus, it would be beneficial to provide a mechanism by which system memory may be effectively used as graphics memory.

SUMMARY

In one embodiment, the invention provides a method to programmably establish a plurality of graphic buffers in a computer system having a banked system memory architecture. The method includes obtaining a first indication representing a performance characteristic of the computer system, obtaining a second indication representing a size of the system memory, selecting a plurality of graphic buffer configurations based on the first and second indications, and establishing one graphic buffer for each of the selected graphic buffer configurations in system memory, where at least two of the plurality of graphic buffers are located in different banks of the system memory.

DETAILED DESCRIPTION

Techniques to utilize system memory for the storage and retrieval of graphical graphic buffer data are described. The following embodiments, described in terms of an integrated graphics controller and a banked memory architecture computer system are illustrative only and are not to be considered limiting in any respect.

Figure 2:
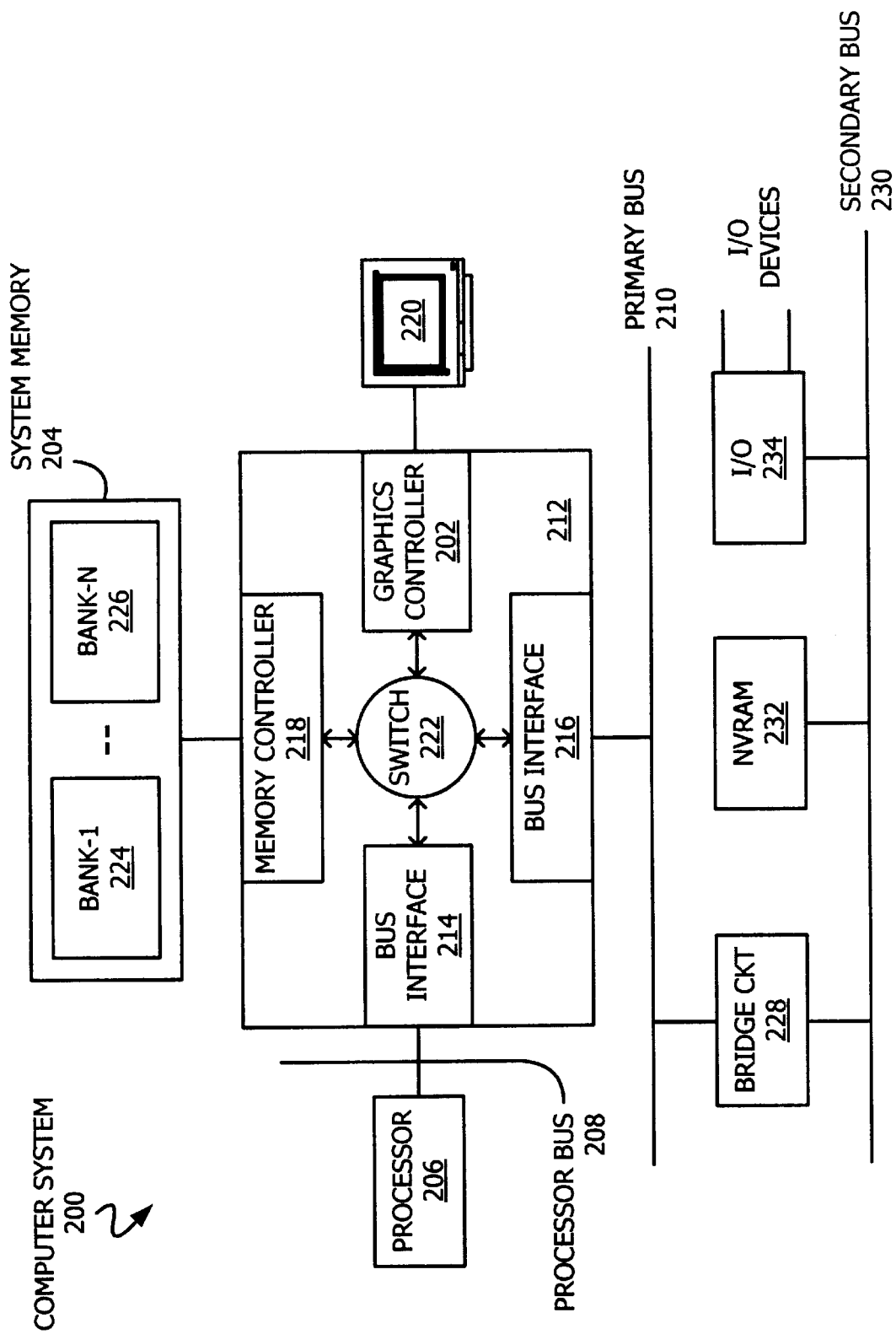
FIG. 2 shows a computer system in accordance with one embodiment of the invention.

Referring to FIG. 2, computer system 200 having an integrated graphics controller 202 that uses system memory 204 in accordance with one embodiment of the invention is shown. Computer system 200 includes host processor 206 coupled to processor bus 208 which, in turn, is coupled to primary bus 210 through bridge circuit 212. Host processor 206 may be any type of general or special purpose processor including multiple processors. Processor bus 208 may be any type of communication channel suitable for coupling host processor 206 to bridge circuit 212.

Illustrative bridge circuit 212 includes bus interface 214 for communicating with processor bus 208, bus interface 216 for communicating with primary bus 210, memory controller 218 for communicating with system memory 204, graphics controller 202 for communicating with graphics device 220, and switch 222 for selectively coupling each of 202, 214, 216, and 218. An illustrative primary bus conforms to the Peripheral Component Interface (PCI) specification (see the "Peripheral Component Interface Local Bus Specification," Revision 2.1, June 1995). System memory 204 may be any type of random access memory (RAM) organized into a plurality of banks, e.g., bank-1 224 through bank-N 226. In one embodiment, each bank (e.g., bank-1 224) may include a plurality of memory devices or chips. In another embodiment, system memory 204 comprises double data rate (DDR) synchronous dynamic random access memory (SDRAM). In yet another embodiment, system memory 204 comprises SyncLink dynamic random access memory (SLDRAM) or Rambus dynamic random access memory (RDRAM). A standard defining SyncLink memory has been assigned the tentative designation of IEEE-1596.7 by the Institute of Electrical and Electronics Engineers (IEEE). The Rambus® standard is published by Rambus, Incorporated of Mountain View, Calif.

Bridge circuit 228 couples primary bus 210 to secondary bus 230. Secondary bus 230 provides a mechanism to couple non-volatile random access memory (NVRAM) 232 and a variety of input-output (I/O) devices, through I/O circuit 234, to computer system 200. Illustrative secondary buses include those buses conforming to the Low Pin Count (LPC) Interface, Industry Standard Architecture (ISA), and Extended Industry Standard Architecture (EISA) specifications. Illustrative NVRAM 232 include read only memory (ROM), electrically programmable read only memory (EPROM), electrically erasable programmable read only memory (EEPROM), flash memory, and complementary metal oxide semiconductor (CMOS) memory.

In accordance with the invention generally, graphic buffer memory may be allocated from system memory during computer system startup and/or reset operations. During startup, for example, a computer system may determine the amount of system memory available and allocate a portion of that memory for use by a graphics controller—that is, establish graphic buffer storage within system memory. The number of graphic buffers established and the size of each graphic buffer may be a function of the available system memory and the type of computer system (a business machine versus a graphics workstation, for example), and may be modified over time. In a banked memory architecture computer system, each of a plurality of graphic buffers may be located in different memory banks. One advantage of this organization is that an open memory page may be maintained for each graphic buffer, potentially increasing the speed of memory access operations to the graphic buffer.

Figure 1:
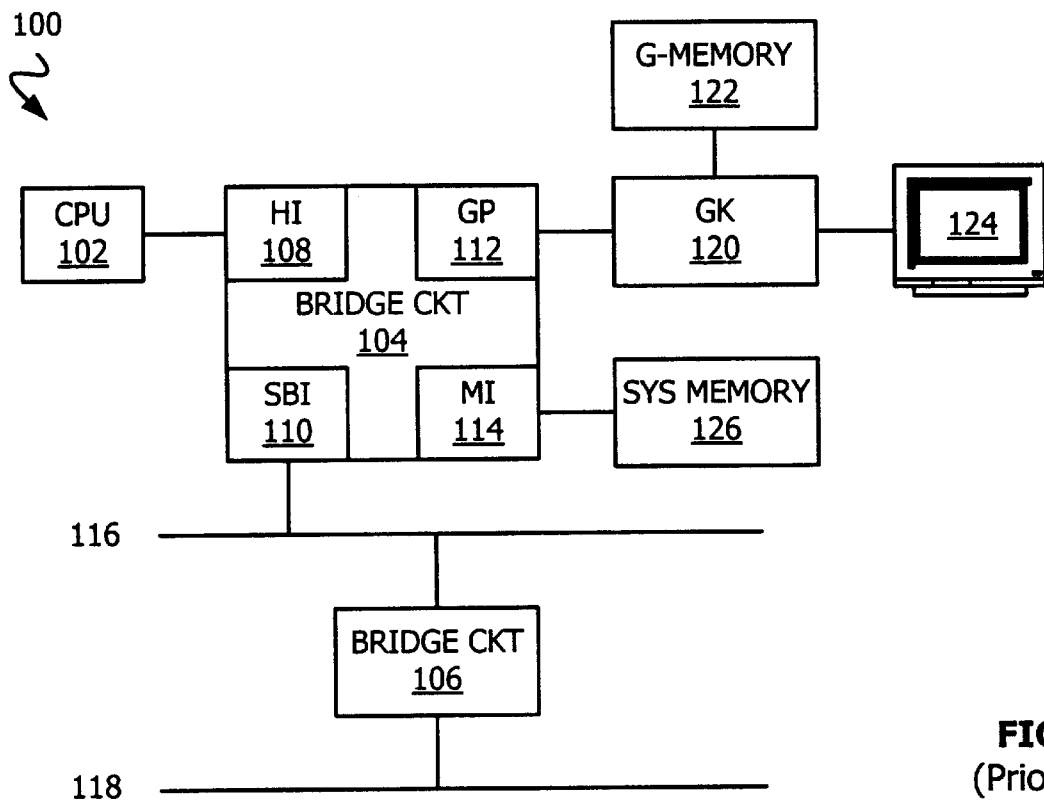
FIG. 1 illustrates a conventional computer system having graphics capability.
Figure 3:
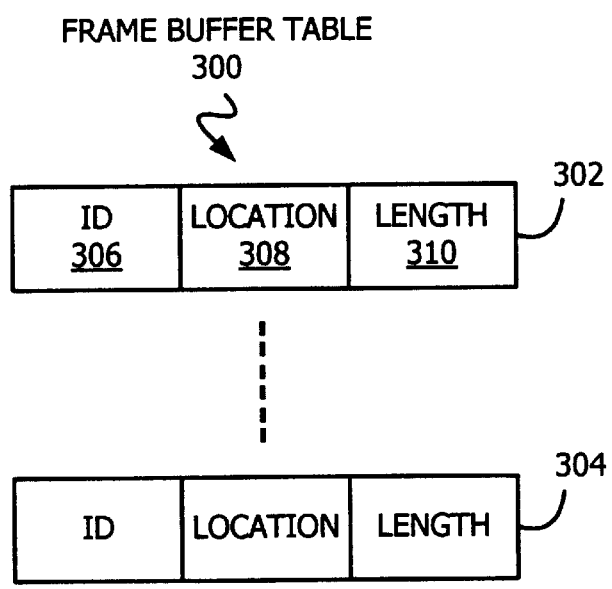
FIGS. 3 shows a graphic buffer table in accordance with one embodiment of the invention.

In accordance with one embodiment of the invention, each of graphics controller 202 and memory controller 218 includes a graphic buffer table. Referring to FIG. 3, a graphic buffer table 300 may include one or more entries, where each entry (e.g., 302 and 304) identifies a graphic buffer (e.g., a front buffer, a back buffer, a z-buffer, an alpha buffer, and a texture buffer). As shown, each entry comprises an identification field (e.g., 306) to identify the graphic buffer associated with the entry, a location field (e.g., 308) to indicate where in system memory 204 the identified graphic buffer is located (typically, an address corresponding to the first element in the identified graphic buffer), and a length field (e.g., 310) to indicate the size of the identified graphic buffer. Graphic buffer table 300 may be incorporated within a controller's (graphics or memory) address translation table, or it may be implemented as a separate table. Graphic buffer table entries (e.g., 302 and 304) may be implemented in special purpose registers or as locations within a memory array. Further, graphic buffer table entries may be logically located in PCI configuration space. For example, a first graphic buffer table may be located in graphic controller 202's configuration space while a second graphic buffer table may be located in memory controller 218's PCI configuration space.

Figure 4:
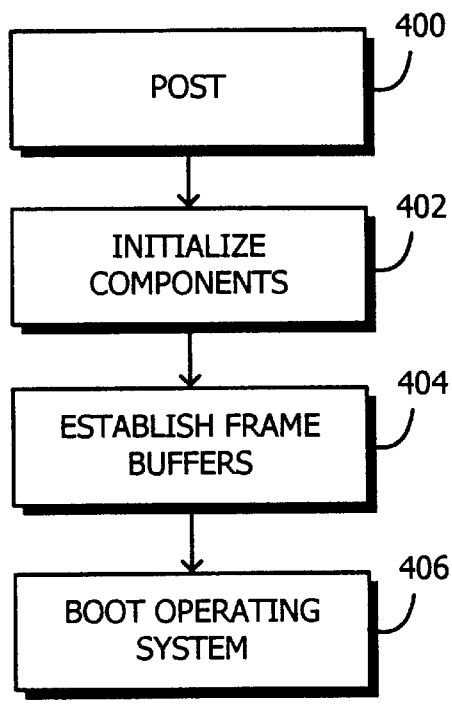
FIG. 4 shows a flow chart for a system startup sequence in accordance with one embodiment of the invention.

In accordance with one embodiment of the invention, one or more graphic buffers may be established at computer system startup and/or as part of a system reset operation. Referring to FIG. 4 for example, on computer system 200 startup a series of system checks may be performed (block 400). System checks are generally performed by basic input-output system (BIOS) instructions and are collectively referred to as power-on self test (POST) routines. Typically, POST processing checks system components such as memory, disk storage units, and any expansion cards for proper functioning. Once BIOS verifies that system components are functioning properly, additional BIOS routines may initialize various components (block 402). Following, in conjunction with, or before the acts of block 402, BIOS may establish one or more graphic buffers by setting graphic buffer table entries (e.g., 302 and 304) to appropriate values (block 404). As indicated above, graphic buffer table 300 entries may exist within the configuration space of both graphics controller 202 and memory controller 218 and, as such, may be set via conventional configuration space write operations. Following the acts of blocks 402 and 404, BIOS typically initiates a boot sequence to load an operating system controlling computer system operations (block 406).

Figure 5:
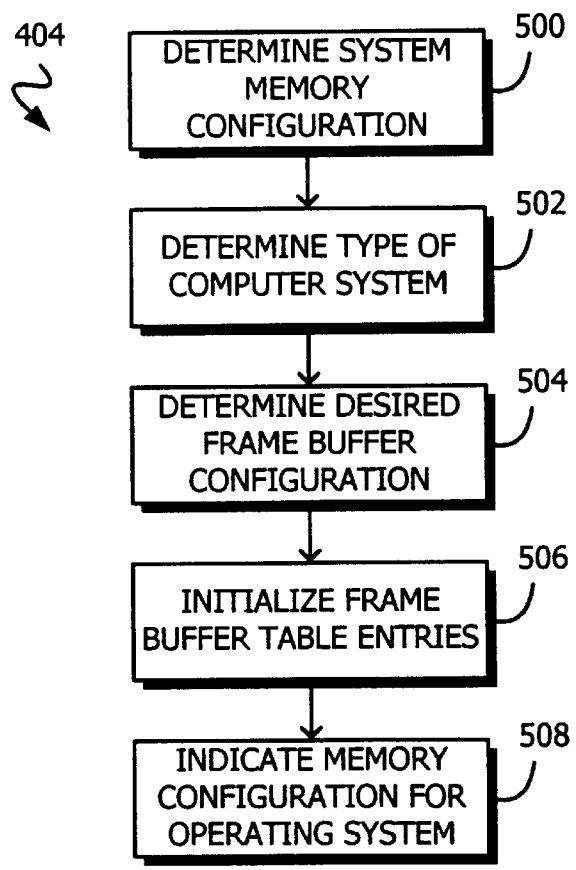
FIG. 5 shows a method to establish graphic buffer storage in system memory in accordance with one embodiment of the invention.

A method to establish graphic buffers (block 404) in accordance with one embodiment of the invention is shown in FIG. 5. To begin, BIOS determines system memory configuration (block 500). For example, BIOS may query memory controller 218 to determine the amount (e.g., the number of megabytes) and the number of banks in system memory 204. Next, BIOS may determine the type of computer system being initialized (block 502). For instance, computer system 200 may be configured as a two dimensional (2D) graphics processor needing only a relatively small amount of graphic buffer memory (e.g., a 1 megabyte front graphic buffer and a 1 megabyte back graphic buffer). Alternatively, computer system 200 may be configured as a high-end three dimensional (3D) graphics workstation needing a larger number of graphic buffers (e.g., front, back, z, alpha, and texture graphic buffers) each using a relatively large amount of memory. Of course, computer system 200 may be initialized at some point (e.g., combination and size of graphic buffers) between these two illustrative extremes. In one embodiment, BIOS may obtain an indication of computer system 200's type from BIOS memory (e.g., ROM memory—NVRAM 234). In another embodiment, BIOS may obtain an indication of computer system 200's type from a user modifiable memory (e.g., CMOS RAM—NVRAM 234).

Using the information obtained through the acts of blocks 500 ad 502, BIOS may determine a configuration for computer system 200's graphic buffer memory (block 504). In one embodiment, BIOS may interrogate a table stored in NVRAM 234 to determine what graphic buffers to establish and how large each graphic buffer should be. Table 1 shows one example table that BIOS may use. In Table 1 "back" refers to a back graphic buffer, "front" refers to a front graphic buffer, "texture" refers to a texture graphic buffer, and "alpha" refers to an alpha or transparency graphic buffer. In addition, the number following each graphic buffer designation in Table 1 indicates the size (in megabytes, MB) of the graphic buffer. It will be understood by those of ordinary skill that Table 1 is not an exhaustive presentation of the possible graphic buffer configurations or types of possible computer systems. Table 1 serves to illustrate one technique by which BIOS may determine an initial graphic buffer configuration only, and should not be considered limiting in any respect.

TABLE 1

Example Graphic buffer Parameters

| Type of System | System Memory Size (MB) | | | |
|---|---|---|---|---|
| | 32 | 64 | 128 | 256 |
| Simple 2D | Front (2); Back (2) | Front (2); Back (2) | Front (2); Back (2) | Front (4); Back (4) |
| Robust 2D | Front (2); Back (2); Texture (2) | Front (2); Back (2); Texture (2) | Front (4); Back (4); Texture (4) | Front (4); Back (4); Texture (4) |
| Simple 3D | Front (2); Back (2); Z (2); Texture (2) | Front (4); Back (4); Z (4); Texture (4) | Front (4); Back (4); Z (4); Texture (4) | Front (4); Back (8); Z (8); Texture (8) |
| Robust 3D | Front (2); Back (2); | Front (4); Back (4); | Front (8); Back (8); | Front (16); Back (16); |

TABLE 1-continued

Example Graphic buffer Parameters

| Type of System | System Memory Size (MB) | | | |
| --- | --- | --- | --- | --- |
| | 32 | 64 | 128 | 256 |
| | Z (2); Alpha (2); Texture (2) | Z (4); Alpha (4); Texture (4) | Z (8); Alpha (8); Texture (8) | Z (16); Alpha (16); Texture (16) |

Referring again to FIG. 2, system memory 204 is comprised of a plurality of banks (e.g., bank-1 224 to bank-N 226). Banks represent a physical compartmentalization of memory space, where each bank may correspond to a unit or array of physical memory. A bank may be further divided into pages, where a page is typically defined in terms of a row address. (All those memory locations in a bank having a common row address are said to be on the same page of memory.) One feature of a banked memory architecture is that consecutive memory access operations to a common page (i.e., an "open" page) may be performed faster than consecutive memory access operations directed to different pages within the same bank. Methods in accordance with the invention may take advantage of this feature by establishing, to the extent possible, each graphic buffer in a separate memory bank. In this way, memory controller 218 may reduce the number of bank access conflicts and precharge delays. Of course, if there are fewer memory banks (determined in block 500) than desired graphic buffers, more than one graphic buffer may be located in a single bank. The precise location of a graphic buffer within each bank is a design decision.

Having determined the number, size, and location of each graphic buffer to be established, BIOS may set the contents of graphic buffer table entries (block 506). For example, one entry for each graphic buffer being established (in each of the graphics controller 202 and memory controller 218) would be initialized by writing to that entry's location in the appropriate configuration space: identification field 306 would be set to indicate the graphic buffer (e.g., z-graphic buffer); location field 308 would be set to indicate the graphic buffer's starting location in system memory 204; and length field 310 would be set to indicate the size of the graphic buffer. Next, BIOS may indicate (in a conventional manner) what memory is available to a subsequently loaded operating system (block 508).

BIOS routines are typically stored in nonvolatile memory 234. Illustrative nonvolatile memories include ROM, EPROM, EEPROM, and flash memories. Parameters such as the type of computer system may also be stored in a nonvolatile memory. In one embodiment, system type information may be stored in the same nonvolatile memory as BIOS. In another embodiment, a user modifiable nonvolatile memory such as CMOS memory may be used. In the latter case, a user may modify the system type indication through a system setup application.

During computer system operations (e.g., after an operating system assumes control following POST processing), memory controller 218 may dynamically allocate memory bandwidth between graphics controller 202 and other memory requestors (e.g., processor 206). That is, access to system memory 204 (graphic buffer memory, system memory, or application memory) may be arbitrated and allocated on a demand basis. Alternatively, memory controller 218 may allocate memory access bandwidth based on a priority or time-slot scheme.

The ability to programmatically establish graphic buffer storage within system memory allows the design and manufacture of computer systems that do not require a user to purchase and install special purpose graphics hardware. One benefit of this may be to reduce the cost of a graphics capable computer system. Another benefit may be to reduce the system complexity and time required for a user to setup a graphics capable computer system. Yet another benefit may be to reduce the number of components, and therefore the manufacturing cost, of a graphics capable computer system.

Various changes in the materials, components, circuit elements, as well as in the details of the illustrated operational methods are possible without departing from the scope of the claims. For instance, BIOS may make different graphic buffers different sizes (in the example shown in Table 1, each graphic buffer was assigned an equal amount of memory). In addition, a computer system in accordance with the invention need not include graphics controller 202 and memory controller 218 in a common component. For example, graphics controller 202 may be in a different component coupled to primary bus 210. In addition, acts in accordance with FIGS. 4 and 5 may be performed by a programmable control device executing instructions organized into a program module. A programmable control device may be a single computer processor, a plurality of computer processors coupled by a communications link, or a custom designed state machine. Custom designed state machines may be embodied in a hardware device such as a printed circuit board comprising discrete logic, integrated circuits, or specially designed application specific integrated circuits (ASICs). Storage devices suitable for tangibly embodying program instructions include all forms of nonvolatile memory including, but not limited to: semiconductor memory devices such as EPROM, EEPROM, and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to programmably establish a plurality of graphic buffers in a computer system having a banked system memory architecture, comprising:
    obtaining a first indication representing a performance characteristic of the computer system;
    obtaining a second indication representing a size of the system memory;
    selecting a plurality of graphic buffer configurations based on the first and second indications; and
    establishing one graphic buffer for each of the selected graphic buffer configurations in system memory, at least two of the plurality of graphic buffers located in different banks of the system memory.

2. The method of claim 1, wherein the act of obtaining a first indication comprises retrieving a computer system type indicator from a memory.

3. The method of claim 2, wherein the act of retrieving comprises accessing a nonvolatile memory.

4. The method of claim 3, wherein the act of accessing comprises accessing a user modifiable nonvolatile memory.

5. The method of claim 3, wherein the act of accessing comprises requesting a type designation from a user.

6. The method of claim 1, wherein the act of obtaining a second indication comprises communicating with a system memory controller.

7. The method of claim 1, wherein the act of selecting comprises obtaining a plurality of graphic buffer configurations from a nonvolatile memory, each graphic buffer configuration having an identification portion to identify a specific graphic buffer and a size portion to indicate the size of the specific graphic buffer.

8. The method of claim 7, wherein the act of establishing comprises:

allocating a first graphic buffer, indicated by a first graphic buffer configuration from the plurality of graphic buffer configurations, in a first bank of the system memory; and allocating a second graphic buffer, indicated by a second graphic buffer configuration from the plurality of graphic buffer configurations, in a second bank of the system memory.

9. The method of claim 8, wherein the act of allocating the first graphic buffer comprises:

storing a value representing the size of the first graphic buffer in a memory accessible to a graphics controller; and storing a value representing a location in system memory where the first graphic buffer is to be located.

10. The method of claim 9, further comprising storing a value identifying the first graphic buffer in the memory accessible to a graphics controller.

11. The method of claim 9, wherein the act of storing a value representing a location in system memory where the first graphic buffer is to be located comprises storing a value representing a starting location in system memory where the first graphic buffer is to be located.

12. The method of claim 9, wherein the ads of storing comprise storing into a memory accessible to a system memory controller.

13. A method comprising:

determining one or more criteria relating to establishing graphic buffers in a system memory of a computer system, the system memory having plural banks;

identifying types of graphic buffers to establish based on the determined one or more criteria; and allocating the identified types of graphic buffers in the system memory, wherein at least two of the graphic buffers are located in different banks of the system memory.

14. The method of claim 13, further comprising identifying a size for each of the identified types of graphic buffers.

15. The method of claim 14, further comprising setting graphic buffer table entries for the allocated graphic buffers.

16. The method of claim 13, further comprising setting graphic buffer table entries for the allocated graphic buffers.

17. The method of claim 13, wherein identifying types of graphic buffers to establish comprises identifying two or more of a front graphic buffer, a back graphic buffer, a texture graphic buffer, an alpha graphic buffer, and a z graphic buffer.

18. The method of claim 13, wherein determining the one or more criteria comprises determining an arrangement of the system memory.

19. The method of claim 18, wherein determining the one or more criteria comprises determining a performance characteristic of the computer system.

20. The method of claim 19, wherein determining the performance characteristic comprises determining one of a simple two-dimensional type of computer system, a robust two-dimensional type of computer system, a simple three-dimensional type of computer system, and a robust three-dimensional type of computer system.

* * * * *

UNITED STATES PATENT AND TRADEMARK OFFICE
CERTIFICATE OF CORRECTION

PATENT NO.   : 6,414,688 B1
DATED        : July 2, 2002
INVENTOR(S)  : Joseph M. Jeddeloh It is certified that error appears in the above-identified patent and that said Letters Patent is hereby corrected as shown below:

<u>Column 7,</u>
Line 36, "ads" should be -- acts --.

Signed and Sealed this

Twenty-seventh Day of August, 2002

*Attest:*

*Attesting Officer*

JAMES E. ROGAN
*Director of the United States Patent and Trademark Office*